United States Patent
Ohashi

(10) Patent No.: US 7,592,092 B2
(45) Date of Patent: Sep. 22, 2009

(54) FUEL CELL HAVING A HYDROGEN ELECTRODE CATALYST LAYER POROSITY THAT IS LOWER THAN THE AIR ELECTRODE CATALYST LAYER POROSITY

(75) Inventor: Sozaburo Ohashi, Nagoya (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 64 days.

(21) Appl. No.: 10/562,970

(22) PCT Filed: Nov. 24, 2004

(86) PCT No.: PCT/JP2004/017825
§ 371 (c)(1),
(2), (4) Date: Dec. 29, 2005

(87) PCT Pub. No.: WO2005/057698
PCT Pub. Date: Jun. 23, 2005

(65) Prior Publication Data
US 2006/0166073 A1     Jul. 27, 2006

(30) Foreign Application Priority Data
Dec. 11, 2003   (JP)  ............................ 2003-413680

(51) Int. Cl.
H01M 4/90      (2006.01)
(52) U.S. Cl. .......................................... 429/41; 429/40
(58) Field of Classification Search .................. 429/40, 429/41
See application file for complete search history.

(56) References Cited

U.S. PATENT DOCUMENTS 5,350,643 A * 9/1994 Imahashi et al. .............. 429/33
5,500,292 A * 3/1996 Muranaka et al. ........... 429/209
2003/0157396 A1  8/2003 Beckmann et al.

FOREIGN PATENT DOCUMENTS

| EP | 0560295 A1 | 9/1993 |
|---|---|---|
| EP | 1 429 403 A2 | 6/2004 |
| JP | A 58-150271 | 9/1983 |
| JP | A 5-251086 | 9/1993 |
| JP | A 6-052871 | 2/1994 |
| JP | A 7-201334 | 8/1995 |

(Continued)

*Primary Examiner*—Mark Ruthkosky
(74) *Attorney, Agent, or Firm*—Oliff & Berridge, PLC

(57) ABSTRACT

In a membrane electrode assembly 1 of a fuel cell, the porosity of a hydrogen electrode-side catalyst layer 11a is made to be lower than that of an air electrode-side catalyst layer 11b. Specifically, the weight ratio of ion-exchange resin to carbon carriers of the hydrogen electrode-side catalyst layer is made to be larger than such ratio of the air electrode-side catalyst layer, the hydrogen electrode-side catalyst layer is allowed to contain an additive having a certain particle diameter or less, or the hydrogen electrode-side catalyst layer is formed by spraying a catalyst ink and the air electrode-side catalyst layer is formed by a transfer method. According to the present invention, the amount of hydrogen that permeates from the hydrogen electrode-side catalyst layer to the air electrode-side catalyst layer via an electrolyte membrane is reduced to suppress a direct hydrogen combustion reaction in the air electrode-side catalyst layer, thereby improving the fuel cell durability.

6 Claims, 3 Drawing Sheets

FOREIGN PATENT DOCUMENTS

| | | |
|---|---|---|
| JP | A 8-138715 | 5/1996 |
| JP | A 8-138718 | 5/1996 |
| JP | A 2001-057218 | 2/2001 |
| JP | A 2004-186049 | 7/2004 |
| JP | A 2004-349037 | 12/2004 |
| WO | WO 93/03505 | 2/1993 |

* cited by examiner

Transitions in the amount of cross leak

US 7,592,092 B2

FUEL CELL HAVING A HYDROGEN ELECTRODE CATALYST LAYER POROSITY THAT IS LOWER THAN THE AIR ELECTRODE CATALYST LAYER POROSITY

TECHNICAL FIELD

The present invention relates to a fuel cell, and particularly to a solid polymer fuel cell comprising a membrane electrode assembly.

BACKGROUND ART

FIG. 6 shows the main portion of a solid polymer fuel cell, in which a membrane electrode assembly (MEA) 1 is sandwiched between separators (not shown). A number of MEAs are disposed in the fuel cell. The MEA 1 comprises a hydrogen electrode-side catalyst layer 11a formed on one side of an electrolyte membrane 10 that comprises ion-exchange resin and an air electrode-side catalyst layer 11b formed on the other side thereof. In general, a catalyst layer of a fuel cell electrode has a structure in which a carbon carrier is allowed to support a noble metal such as platinum and ion-exchange resin covers the surface of such carbon carrier having a catalyst supported thereon. Such catalyst layer is required to have functions of gaseous diffusibility, electronic conductivity, and ionic conductivity, in addition to allowing catalytic reactions to occur therein.

A catalyst layer is formed in one of the following manners: a catalyst ink comprising a carbon carrier having a catalyst supported thereon, a solvent, and ion-exchange resin (electrolyte) is prepared to be applied on an electrolyte membrane by spraying or by an applicator using a doctor blade technique followed by drying; or the catalyst ink is applied on a substrate such as a PTFE substrate or a PET substrate to be thermally transferred to an electrolyte membrane under pressure by hot pressing. Further, gas diffusion layers 12a and 12b are laminated on the catalyst layers 11a and 11b, respectively. Via channels formed on the separators, hydrogen to serve as fuel gas, and in general, air to serve as oxidation gas are supplied to the hydrogen electrode-side catalyst layer 11a and the air electrode-side catalyst layer 11b, respectively.

An improved level of gaseous diffusibility in a catalyst layer is advantageous for the promotion of catalytic reactions in a catalyst layer. Thus, it is common practice to design a catalyst layer having an improved pore volume. In view of this, JP Patent publication (Kokai) No. 8-138715 A discloses a technique for forming a porous electrode catalyst layer with a high porosity by allowing electrode catalyst salts and polymer particles to adsorb together on an electrolyte membrane by dispersion plating involved in chemical plating, followed by removal of the polymer particles using an acidic solution.

DISCLOSURE OF THE INVENTION

The present inventors have been involved in studies and production of a solid polymer fuel cell. In such process, regarding a solid polymer fuel cell as shown in FIG. 6, the present inventors have experienced the fact that hydrogen that has permeated through an electrolyte membrane from the hydrogen electrode side during power generation may cause a direct combustion reaction with oxygen or the generation of hydrogen peroxide on the air electrode side. Such direct combustion reaction and generation of hydrogen peroxide on the air electrode side induce deterioration in a catalyst layer or an electrolyte membrane so as to reduce fuel cell service life. Therefore, these problems must be avoided.

Meanwhile, as described above, it is common practice to design a catalyst layer having an improved pore volume so as to promote catalytic reactions. For such purpose, a new proposal as described in Patent document 1, for example, has been made. However, when the pore volume of a hydrogen electrode-side catalyst layer is increased, the level of hydrogen diffusibility is also increased, resulting in the permeation of an increased amount of hydrogen through an electrolyte membrane. This may be responsible for the direct combustion reaction and the generation of hydrogen peroxide that cause deterioration in an air electrode-side catalyst layer.

The present inventors considered that reduction of the amount of hydrogen that permeates through an electrolyte membrane would suppress the direct combustion reaction with hydrogen and the amount of hydrogen peroxide to be generated, thereby improving fuel cell service life. Thus, the present inventors produced an MEA in which the porosity of a hydrogen electrode-side catalyst layer is made to be lower than that of an air electrode-side catalyst layer so as to determine the service life of a fuel cell comprising such MEA. Accordingly, the present inventors found that the service life of such fuel cell can obviously be extended compared with a fuel cell comprising an MEA in which the porosity of hydrogen electrode-side catalyst layer is of the same degree as that of air electrode-side catalyst layer.

The present invention has been made based on the above findings. The fuel cell of the present invention is a fuel cell having at least an MEA comprising an electrolyte membrane, a hydrogen electrode-side catalyst layer formed on one side thereof, and an air electrode-side catalyst layer formed on the other side thereof, in which the porosity of the hydrogen electrode-side catalyst layer is made to be lower than that of the air electrode-side catalyst layer.

The structure described above can suppress the direct combustion reaction or the generation of hydrogen peroxide in an air electrode-side catalyst layer so that the service life of the fuel cell can be extended compared with a fuel cell in which the porosity of a hydrogen electrode-side catalyst layer is of the same degree as that of an air electrode-side catalyst layer. In addition, when the porosity of a hydrogen electrode-side catalyst layer is made to be lower than that of an air electrode-side catalyst layer, the level of hydrogen diffusion in the hydrogen electrode-side catalyst layer is reduced compared with the case of a conventional fuel cell. However, in a reaction in a solid polymer fuel cell, the step of the reaction that takes place on the air electrode side overwhelmingly constitutes the rate-determining step, so that it is impossible for the step of the hydrogen reduction reaction on the hydrogen electrode side to be the rate-determining step. Therefore, continuous supply of the theoretical amount of gas (stoichiometric ratio of hydrogen to oxygen of 1 or more) does not influence fuel cell performance.

There are a variety of specific methods for allowing the porosity of a hydrogen electrode-side catalyst layer to become lower than that of an air electrode-side catalyst layer. For instance, the weight ratio of ion-exchange resin (electrolyte) to carbon carriers of a hydrogen electrode-side catalyst layer may be made larger than such ratio of an air electrode-side catalyst layer. When the amount of ion-exchange resin is increased, a resin film on carbon particles (carrier) becomes thicker so that the volume of pore space between particles is reduced. Therefore, the porosity of the hydrogen electrode-side catalyst layer is made to be lower than that of the air electrode-side catalyst layer.

According to the experimentation conducted by the present inventors, in the case of a generally used solid polymer fuel cell, the weight ratio of ion-exchange resin to carbon carriers of an air electrode-side catalyst layer was greater than or equal to 0.4:1 and less than 1.5:1. In this case, the expected purpose could be fully accomplished when the weight ratio of ion-exchange resin to carbon carriers of a hydrogen electrode-side catalyst layer was greater than or equal to 1.5:1 and less than 3.0:1. More preferably, the weight ratio of ion-exchange resin to carbon carriers of an air electrode-side catalyst layer was approximately 0.8:1, and the weight ratio of ion-exchange resin to carbon carriers of a hydrogen electrode-side catalyst layer was approximately 2.0:1.

Further, in the case of a generally used solid polymer fuel cell, the volume of pore space of an air electrode-side catalyst layer accounted for 3% to 30% of the total volume of the catalyst layer. In this case, the expected purpose was fully accomplished when the volume of pore space of a hydrogen electrode-side catalyst layer accounted for 1.0% to 3.0% of the total volume of the catalyst layer. Particularly preferably, the volume of pore space of an air electrode-side catalyst layer accounted for approximately 30% of the total volume of the catalyst layer, and at the same time, the volume of pore space of a hydrogen electrode-side catalyst layer accounted for approximately 2.0% of the total volume of the catalyst layer.

Another method that may be used is a method for allowing a hydrogen electrode-side catalyst layer to contain an additive having a certain particle diameter or less so that the porosity of a hydrogen electrode-side catalyst layer is made to be lower than that of an air electrode-side catalyst layer. Preferably, examples of such an additive include titanium oxide, zinc oxide, and cerium oxide. Basically, any additive other than a nonionic compound that dissociates into ions in water can be used under the conditions that it have a particle diameter smaller than that of a carbon particle (preferably with an average particle diameter of less than or equal to 0.3 µm) and that it cause no inhibition of catalytic reaction. With the use of this method, such additive can fill the volume of the pore space between particles, resulting in reduction of the pore volume. As a result, the porosity of a hydrogen electrode-side catalyst layer is made to be lower than that of an air electrode-side catalyst layer.

Also in the above case, according to the experimentation made by the present inventors, the expected purpose can be fully accomplished when the volume of pore space of the air electrode-side catalyst layer accounts for 3.0% to 30% of the total volume of the catalyst layer, and at the same time, the volume of pore space of the hydrogen electrode-side catalyst layer accounts for 1.0% to 3.0% of the total volume of the catalyst layer.

Further, another method that may be effective is a method wherein a hydrogen electrode-side catalyst layer is formed by spraying a catalyst ink. On the other hand, an air electrode-side catalyst layer may be formed by a transfer method. Conventionally, the method for forming a catalyst layer that is used is the same for a hydrogen-electrode side catalyst layer and an air electrode-side catalyst layer (for instance, in the case of spraying, the method is applied for both a hydrogen-electrode side catalyst layer and an air electrode-side catalyst layer). However, based on the feature that the volume porosity of a catalyst layer (pore volume to catalyst layer volume) obtained by direct spraying is lower than that obtained by a transfer method, the porosity of a hydrogen electrode-side catalyst layer is made to be lower than that of an air electrode-side catalyst layer by adopting different methods for forming the catalyst layers as described above.

BEST MODE FOR CARRYING OUT THE INVENTION

EXAMPLE 1

(1) Formation of Hydrogen Electrode-side Catalyst Layer

To approximately 10 g of catalyst particles comprising carbon black (Vulcan XC-72, Cabot) having 15 wt % platinum particles supported thereon, 60 g of water and 45 g of ethanol are added in that order. The obtained solution is stirred well and mixed. Thereafter, 80 g of Nafion solution (DC-2020: 21% solution, DuPont) that serves as an electrolyte is added thereto, followed by stirring. The stirred solution is irradiated with sonic waves for approximately 1 minute using an ultrasonic homogenizer, followed by cooling for 5 minutes against subsequent heat generation. After this process has been repeated 10 times, the resulting dispersion solution that serves as a catalyst ink for a hydrogen electrode-side catalyst layer is obtained.

The dispersion solution is applied to a PTFE substrate by an applicator using a doctor blade technique. The amount of the solution applied is adjusted to result in a platinum weight of approximately 0.1 mg/cm$^2$. Thereafter, the solution applied to the substrate is hot-air dried at 100° C. and thermally transferred on an electrolyte membrane under pressure by hot pressing. Then, PTFE is removed therefrom to obtain a hydrogen electrode-side catalyst layer. In a hydrogen electrode-side catalyst layer prepared with the aforementioned component ratio, the weight ratio of ion-exchange resin to carbon carriers is 2.0:1.

(2) Formation of Air Electrode-side Catalyst Layer

To 10 g of a catalyst comprising Ketjen EC (product name: Ketjen Black International Co., Ltd) having 45 wt % platinum particles supported thereon, 50 g of water, 50 g of ethanol, and 26 g of Nafion solution (21%) are added in that order. The subsequent process is performed as in the case of the hydrogen electrode side so as to prepare a dispersion solution containing catalyst particles that serves as a catalyst ink for an air electrode-side catalyst layer. The obtained dispersion solution is applied to a PTFE substrate by an applicator using a doctor blade technique. The amount of the solution applied is adjusted to result in a platinum weight of approximately 0.4 mg/cm$^2$. Thereafter, the solution applied to the substrate is hot-air dried at 100° C. and thermally transferred to an electrolyte membrane under pressure by hot pressing. Then, PTFE is removed therefrom to obtain an air electrode-side catalyst layer. In an air electrode-side catalyst layer prepared with the aforementioned component ratio, the weight ratio of ion-exchange resin to carbon carriers is 1.0:1.

Figure 1:
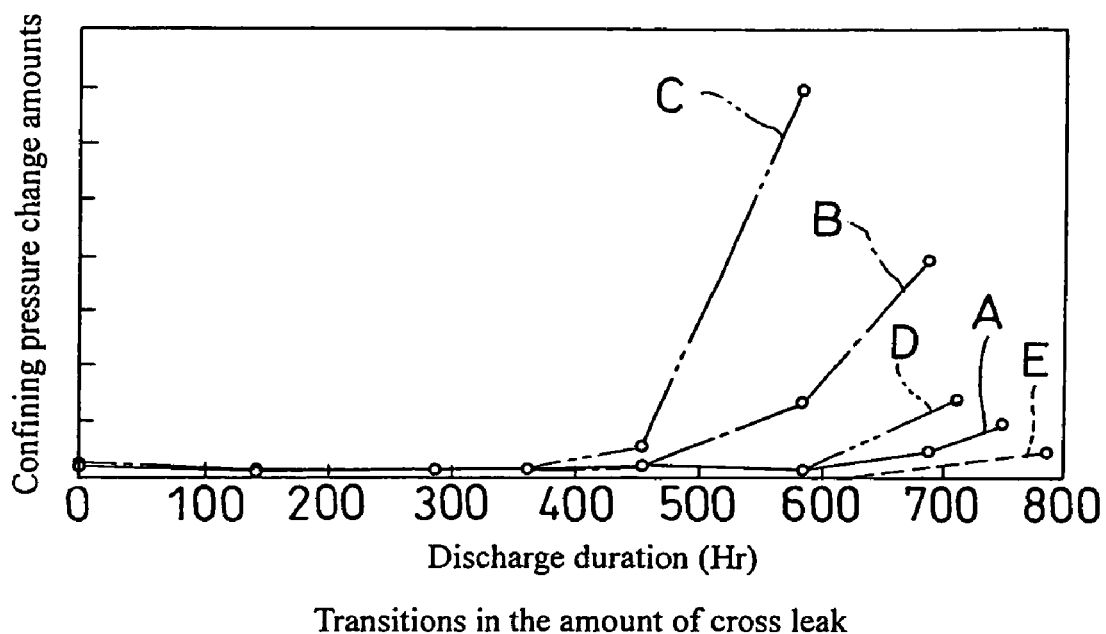
FIG. 1 shows a graph representing transitions in the amount of cross leak in fuel cells in Examples.

(3) An MEA on which a hydrogen electrode-side catalyst layer and an air electrode-side catalyst layer have been formed as described above is used together with a diffusion layer and a separator so as to prepare a fuel cell. FIG. 1 shows changes in the amount of gas that permeates through the electrodes thereof during the continuous fuel cell discharge. In the figure, line A represents the changes when the weight ratio of electrolyte to carbon is 2.0:1. In addition, lines B and C represent the changes when the weight ratios of electrolyte to carbon are 1.0:1 and 0.6:1, respectively. As represented with line A in FIG. 1, confining pressure change amounts over time become extremely small with the use of the fuel cell of the present invention, so that the competitiveness of the present invention is demonstrated.

Figure 2:
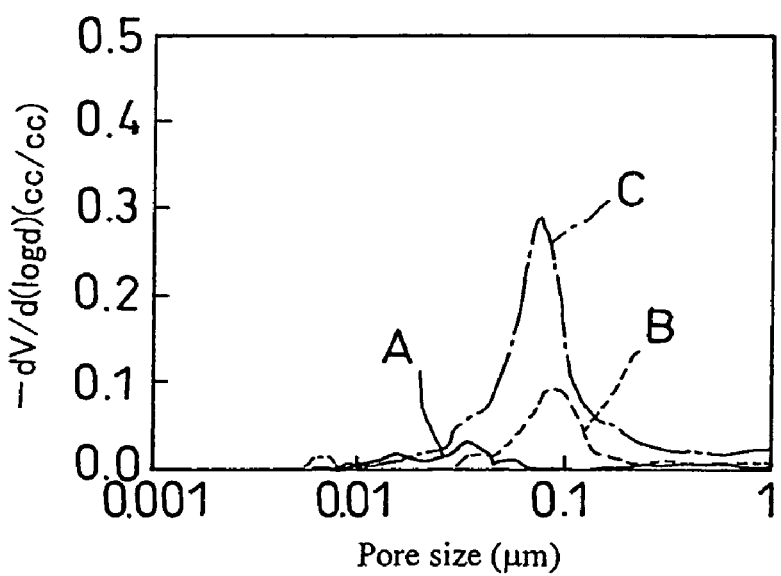
FIG. 2 shows a graph representing the porosity distribution of a catalyst layer in Example 1.
Figure 3:
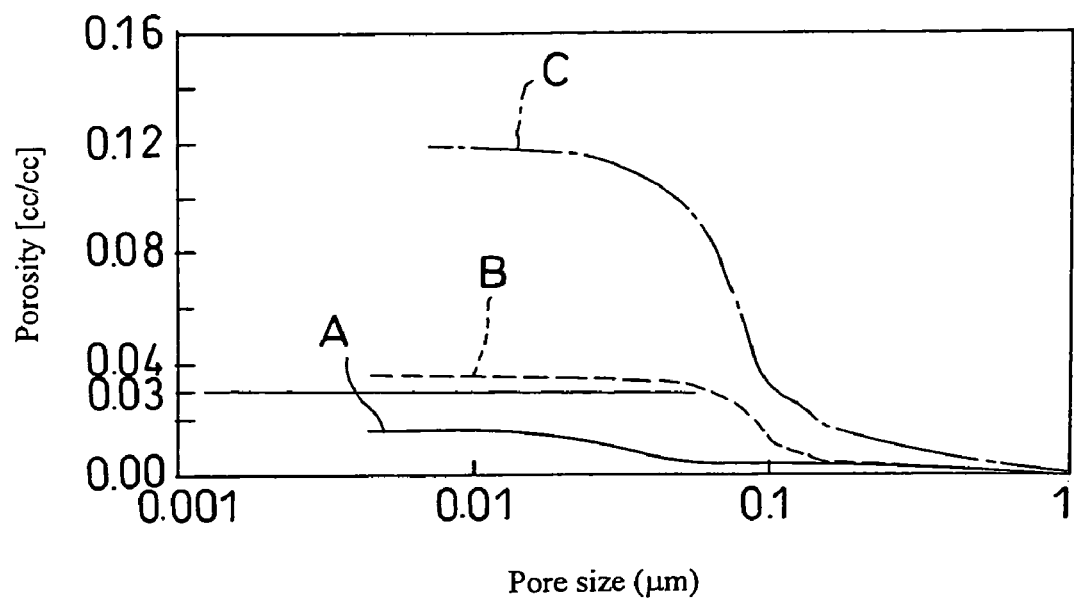
FIG. 3 shows a graph representing the pore volume (cumulative porosity) of a catalyst layer in Example 1.

(4) The catalyst layer porosities in the above cases are determined using a mercury porosimeter. The pore distribution (pore size: 0.001 μm to 1 μm) and the pore volume (cumulative porosity) are shown in FIGS. 2 and 3, respectively. Referring to the figures, it is demonstrated that particular effectiveness is obtained in the present invention when the volume of pore space of a hydrogen electrode-side catalyst layer accounts for 3.0% of the total volume of the catalyst layer.

EXAMPLE 2

(1) Formation of Hydrogen Electrode-side Catalyst Layer

To approximately 10 g of catalyst particles comprising carbon black (Vulcan XC-72, Cabot) having 15 wt % platinum particles supported thereon, 60 g of water and 45 g of ethanol are added in that order. The obtained solution is stirred well and mixed. Thereafter, 40 g of Nafion solution (DC-2020: 21% solution, DuPont) is added thereto, followed by stirring. To the thus obtained solution, 4.3 g of titanium oxide (product name: MT-100AQ; average particle diameter: 0.24 μm, Tayca) that serves as an additive is added, followed by stirring. The stirred solution is irradiated with sonic waves for approximately 1 minute using an ultrasonic homogenizer, followed by cooling for 5 minutes against subsequent heat generation. After this process has been repeated 10 times, the resulting dispersion solution that serves as a catalyst ink for a hydrogen electrode-side catalyst layer is obtained.

The dispersion solution is applied to a PTFE substrate by an applicator using a doctor blade technique. The amount of the solution applied is adjusted to result in a platinum weight of approximately 0.1 mg/cm$^2$. Thereafter, the solution applied to the substrate is hot-air dried at 100° C., and thermally transferred to an electrolyte membrane under pressure by hot pressing. Then, PTFE is removed therefrom to obtain a hydrogen electrode-side catalyst layer.

(2) Formation of Air Electrode-side Catalyst Layer

To 10 g of catalyst comprising Ketjen EC (product name: Ketjen Black International Co., Ltd) having 45 wt % platinum particles supported thereon, 50 g of water, 50 g of ethanol, and 26 g of Nafion solution (21%) are added in that order. The subsequent process is performed as in the case of the hydrogen electrode side so as to prepare a dispersion solution containing catalyst particles, which serves as a catalyst ink for an air electrode-side catalyst layer.

The obtained dispersion solution is applied to a PTFE substrate by an applicator using a doctor blade technique. The amount of the solution applied is adjusted to result in a platinum weight of approximately 0.4 mg/cm$^2$. Thereafter, the solution applied to the substrate is hot-air dried at 100° C. and thermally transferred to an electrolyte membrane under pressure by hot pressing. Then, PTFE is removed therefrom to obtain an air electrode-side catalyst layer.

(3) An MEA on which a hydrogen electrode-side catalyst layer and an air electrode-side catalyst layer have been formed as described above is used together with a diffusion layer and a separator so as to prepare a fuel cell. FIG. 1 shows changes in the amount of gas that permeates through the electrodes thereof during the continuous fuel cell discharge with line D. As represented with line D in FIG. 1, confining pressure change amounts over time become extremely small with the use of the fuel cell of the present invention, so that the competitiveness of the present invention is clearly demonstrated.

EXAMPLE 3

(1) Formation of Hydrogen Electrode-side Catalyst Layer

To approximately 10 g of catalyst particles comprising carbon black (Ketjen Black International Co., Ltd) having 45 wt % platinum particles supported thereon, 50 g of water and 50 g of ethanol are added in that order. The obtained solution is stirred well and mixed. Thereafter, 10 g of Nafion solution (DC-2020: 21% solution, DuPont) is added thereto, followed by stirring. The stirred solution is irradiated with sonic waves for approximately 1 minute using an ultrasonic homogenizer, followed by cooling for 5 minutes against subsequent heat generation. After this process has been repeated 10 times, the dispersion solution of the catalyst particles (catalyst ink) is obtained. The thus obtained dispersion solution is applied to an electrolyte membrane by spraying so as to form a hydrogen electrode-side catalyst layer.

(2) Formation of Air Electrode-side Catalyst Layer

The above catalyst ink is applied to a PTFE substrate by an applicator using a doctor blade technique, followed by drying. Thereafter, the catalyst ink on the substrate is thermally transferred to an electrolyte membrane under pressure by hot pressing. Then, PTFE is removed therefrom to obtain an air electrode-side catalyst layer.

(3) An MEA on which a hydrogen electrode-side catalyst layer and an air electrode-side catalyst layer have been formed as described above is used together with a diffusion layer and a separator so as to prepare a fuel cell. FIG. 1 shows changes in the amount of gas that permeates through the electrodes thereof during the continuous fuel cell discharge with line E. As represented with line E in FIG. 1, confining pressure change amounts over time become extremely small with the use of the fuel cell of the present invention, so that the competitiveness of the present invention is clearly demonstrated.

Figure 4:
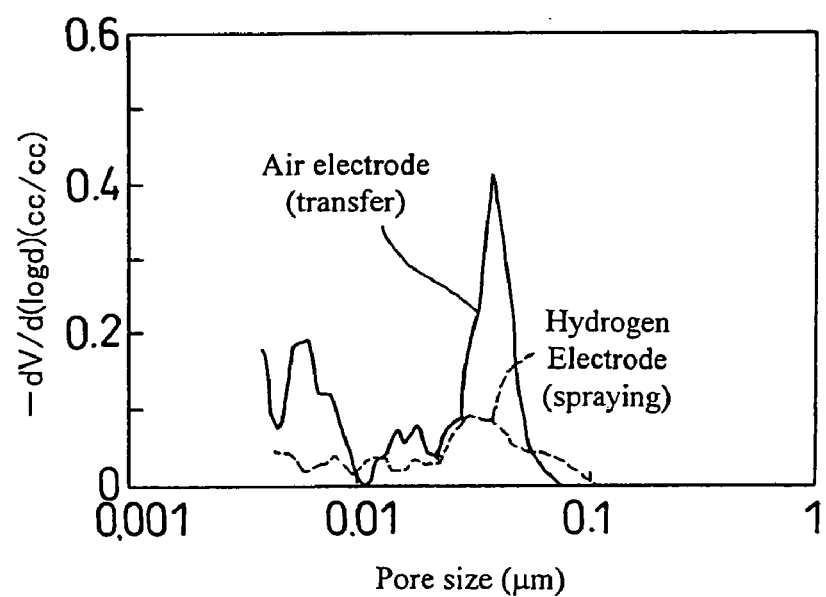
FIG. 4 shows a graph representing the porosity distribution of a catalyst layer in Example 3.
Figure 5:
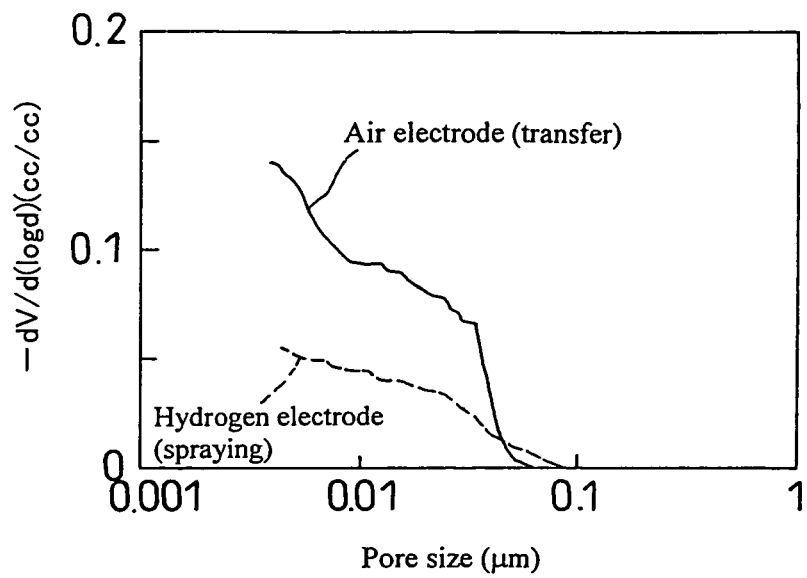
FIG. 5 shows a graph representing the pore volume (cumulative porosity) of a catalyst layer in Example 3.
Figure 6:
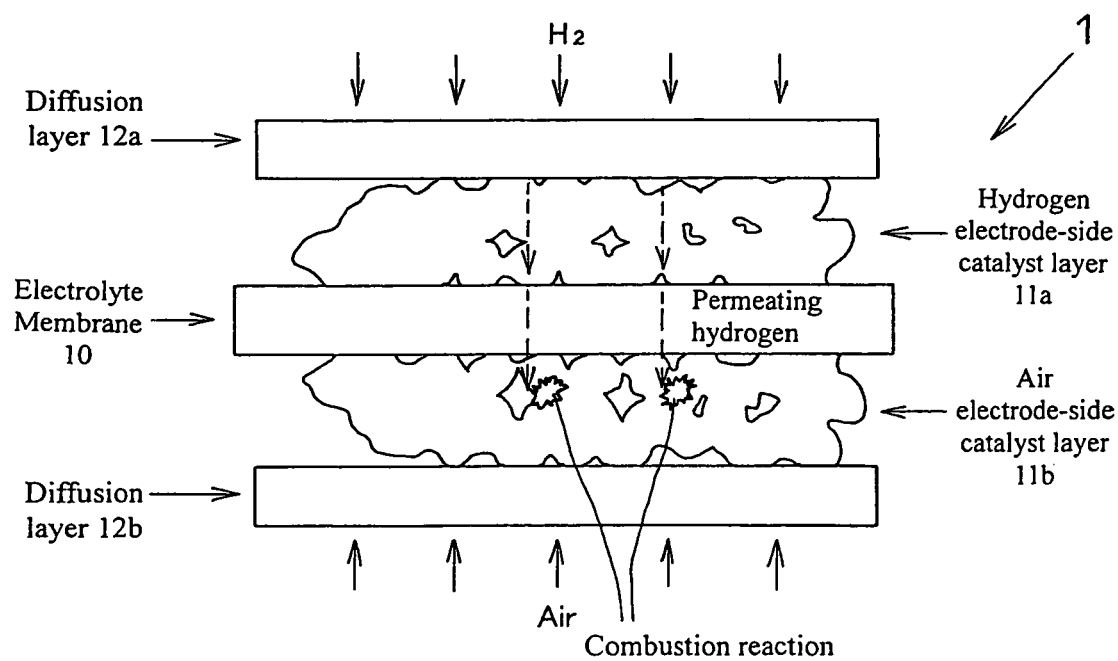
FIG. 6 is an explanatory figure of a combustion reaction in an air electrode-side catalyst layer of a fuel cell comprising an MEA.

(4) The catalyst layer porosity is determined using a mercury porosimeter. The pore distribution (pore size: 0.001 μm to 1 μm) and the pore volume are shown in FIGS. 4 and 5, respectively. Referring to the figures, it is understood that the porosity of a hydrogen electrode-side catalyst layer formed by spraying has obviously become lower than that of an air electrode-side catalyst layer formed by transfer.

INDUSTRIAL APPLICABILITY

According to the present invention, reduction in the amount of hydrogen that permeates (crossover) from a hydrogen electrode-side catalyst layer to an air electrode-side catalyst layer via an electrolyte membrane results in suppression of a direct hydrogen combustion reaction on the air electrode-side catalyst layer, thereby improving fuel cell durability.

The invention claimed is:

1. A fuel cell having at least a membrane electrode assembly comprising:
an electrolyte membrane;
a hydrogen electrode-side catalyst layer formed on one side thereof; and
an air electrode-side catalyst layer formed on the other side thereof,
wherein a porosity of the hydrogen electrode-side catalyst layer is lower than a porosity of the air electrode-side catalyst layer, a volume of pore space of the hydrogen electrode-side catalyst layer has a range of 1.0% to 3.0% of a total volume of the catalyst layer, and a volume of pore space of the air electrode-side catalyst layer has a range of 3% to 30% of the total volume of the catalyst layer,
wherein the hydrogen electrode-side catalyst layer contains an additive having an average particle diameter less than or equal to 0.3 μm and the porosity of the hydrogen electrode-side catalyst layer is lower than the porosity of the air electrode-side catalyst layer, and
wherein the additive is selected from titanium oxide, zinc oxide, and cerium oxide.

2. The fuel cell according to claim 1, wherein the hydrogen electrode-side catalyst layer and the air electrode-side catalyst layer each include ion-exchange resin and carbon carrier and a weight ratio of ion-exchange resin to carbon carrier of the hydrogen electrode-side catalyst layer is larger than a weight ratio of ion-exchange resin to carbon carrier of the air electrode-side catalyst layer, and the porosity of the hydrogen electrode-side catalyst layer is lower than the porosity of the air electrode-side catalyst layer.

3. The fuel cell according to claim 2, wherein the weight ratio of ion-exchange resin to carbon carrier of the hydrogen electrode-side catalyst layer is greater than or equal to 1.5:1 and less than 3.0:1 and the weight ratio of ion-exchange resin to carbon carrier of the air electrode-side catalyst layer is greater than or equal to 0.4:1 and less than 1.5:1.

4. The fuel cell according to claim 2, wherein the volume of pore space of the hydrogen electrode-side catalyst layer is 2% of the total volume of the catalyst layer and the volume of the pore space of the air electrode-side catalyst layer is 30% of the total volume of the catalyst layer.

5. The fuel cell according to claim 1, wherein the hydrogen electrode-side catalyst layer is formed by spraying a catalyst ink and the air electrode-side catalyst layer is formed by a transfer method, and the porosity of the hydrogen electrode-side catalyst layer is lower than the porosity of the air electrode-side catalyst layer.

6. The fuel cell according to claim 2, wherein the volume of pore space of the hydrogen electrode-side catalyst layer is 2% of the total volume of the catalyst layer and a volume of pore space of the air electrode-side catalyst layer is 30% of the total volume of the catalyst layer.

* * * * *